(12) United States Patent
Copeland

(10) Patent No.: US 9,400,071 B1
(45) Date of Patent: Jul. 26, 2016

(54) PIPE JOINT GASKET WITH ARTICULATING ANTI-SLIP SEGMENTS

(71) Applicant: MCWANE INC., Birmingham, AL (US)

(72) Inventor: Daniel A. Copeland, Bessemer, AL (US)

(73) Assignee: McWane, Inc., Birmingham, AL (US)

( * ) Notice: Subject to any disclaimer, the term of this patent is extended or adjusted under 35 U.S.C. 154(b) by 218 days.

(21) Appl. No.: 14/295,888

(22) Filed: Jun. 4, 2014

(51) Int. Cl.
*F16L 17/035* (2006.01)
*F16L 21/02* (2006.01)

(52) U.S. Cl.
CPC ..................................... *F16L 21/02* (2013.01)

(58) Field of Classification Search
CPC ....... F16L 17/035; F16L 19/086; F16L 21/04; F16L 21/08; F16L 21/03
See application file for complete search history.

(56) References Cited

U.S. PATENT DOCUMENTS

| 3,860,270 | A | * | 1/1975 | Arnold | F16L 17/10 277/605 |
| 5,067,751 | A | * | 11/1991 | Walworth | F16L 21/03 285/105 |
| 5,188,401 | A | * | 2/1993 | Staniforth | F16L 19/083 285/249 |
| 5,295,697 | A | | 3/1994 | Weber et al. | |
| 5,464,228 | A | | 11/1995 | Weber et al. | |
| 6,257,628 | B1 | * | 7/2001 | Nijsen | F16L 21/04 285/322 |
| 6,843,514 | B2 | * | 1/2005 | Rex | F16L 21/04 285/323 |
| 8,490,273 | B1 | | 7/2013 | Copeland et al. | |
| 8,857,861 | B2 | * | 10/2014 | German | F16L 37/0845 285/105 |
| 2004/0075217 | A1 | * | 4/2004 | Copeland | F16L 21/04 277/314 |
| 2005/0084327 | A1 | * | 4/2005 | Chelchowski | F16L 19/086 403/345 |

* cited by examiner

*Primary Examiner* — Vishal Patel
(74) *Attorney, Agent, or Firm* — C. Brandon Browning; Maynard, Cooper & Gale, PC

(57) ABSTRACT

A gasket for preventing separation of interconnected pipes including a compressible body having a plurality of multi-sectioned metal segments partially embedded therein. The multi-sectioned metal segments are arranged in groups of two or more or as a continuous ring of segments. The multi-sectioned anti-slip segments are free to articulate according to the curvature of the outer surface of the spigot in a pipe joint. The presence of the multi-sectioned or articulating anti-slip segments increases the resultant segment density on large diameter pipes.

8 Claims, 4 Drawing Sheets

PIPE JOINT GASKET WITH ARTICULATING ANTI-SLIP SEGMENTS

FIELD OF THE INVENTION

The present invention is directed to a pipe joint gasket and more particularly to a pipe joint gasket including an arrangement of metal segments configured for preventing the separation and fracturing of interconnected, telescoping pipes during fluid pressurization.

BACKGROUND OF THE INVENTION

Self-restraining pipe joints refer to pipe joints that do not require any external support for joint restraint. In applications where a fluid such as water for fire mains is held under high pressure, self-restraining pipe joints typically rely on pipe joint gaskets that include anti-slip segments for preventing the separation of the interconnected pipes forming the joint. Exemplary gaskets are described in U.S. Pat. Nos. 5,295,697, 5,464,228 and 8,490,273 in which a rubber gasket, serving as a fluid seal, includes toothed metal segments spaced uniformly around its inner perimeter. The toothed segments bite into the outer surface of the spigot of the inserted pipe and prevent withdrawal of the inserted pipe from a bell end of the other pipe. The segments pivot about a retainer bead in the bell end of the other pipe to allow the spigot end to be inserted into the bell end of the other pipe while preventing withdrawal of the inserted pipe under fluid pressure conditions.

During fluid pressurization of the interconnected pipes, axial thrust force is generated by the resulting hydrostatic pressure, which causes the interconnected pipes to want to separate thereby undoing the pipe joint. A shortcoming of current gaskets which contain anti-slip segments for use in self-restraining pipe joints is that the axial thrust force generated by pipe pressurization increases with the square of the outer diameter of the spigot of the inserted pipe, while the available pipe surface for engagement by the anti-slip segments only increases proportionally with the outer diameter of the spigot. This relationship limits the use of such gaskets in self-restraining pipe joints formed between pipes with relatively large diameters since the lack of available pipe surface area can provide for insufficient engagement the anti-slip segments with the pipe. On the smaller end of the scale, the tight radius of curvature on small diameter pipes limits the contact area of the anti-slip segments with the round, outer surface of the spigot. Accordingly, there is a need for a pipe gasket having anti-slip segments that maximize their engagement with an outer surface area of a pipe. There is also a need for a pipe gasket that improves dissipation of the radial forces imparted to the pipe by anti-slip segments during pressurization so as to decrease the likelihood that the segments over penetrate the pipe and cause a catastrophic failure of the pipe joint.

SUMMARY OF THE INVENTION

The present invention addresses the shortcomings of current gaskets for use in self-restraining pipe joints by incorporating multi-sectioned anti-slip segments that are free to articulate according to the curvature of the outer surface of the spigot in a pipe joint. The presence of the multi-sectioned or articulating anti-slip segments increases the resultant segment density on large diameter pipes, and can result in an essentially continuous restraining ring of segments around the spigot. For small diameter pipes, the articulated segments increase the contact area between the anti-slip segments and the outer surface of the spigot and thereby improve the overall performance of the joint restraint. The benefits of the gasket of the present invention are particularly evident when the gasket is used to retrain pipes made of soft materials such as plastic, including polyvinyl chloride and high density polyethylene.

According to one aspect of the invention there is provided a pipe gasket including a compressible body having an inner face defining an opening for receiving a spigot end of a pipe. A plurality of metal segments is at least partially embedded in the compressible body and circumferentially arranged therein. The plurality of metal segments includes a first metal segment in direct contact with a second metal segment, each of the first metal segment and the second metal segment having at least one tooth extending radially inward through the inner face. The first metal segment further includes a first radially extending face in direct contact with and pressed against a second radially extending face of the second metal segment with essentially no portion of the compressible body being situated there between. Each metal segment of the plurality of metal segments may be in direct contact with one other metal segment of the plurality of metal segments. When arranged in this manner, each of the pairs of connected segments may be contained within a single pocket of the compressible body, the single pocket excluding all other metal segments of the plurality of metal segments. Alternatively, each metal segment of the plurality of metal segments may be in contact with two other metal segments of the plurality of metal segments whereby the plurality of metal segments forms a continuous surface. When arranged in this manner, the plurality of metal segments is contained within a single or continuous pocket or groove formed within the compressible body.

According to another aspect of the invention there is provided a pipe joint restraining apparatus including a pipe gasket and a plurality of anti-slip segments at least partially embedded in the pipe gasket, the plurality of anti-slip segments including a first segment located adjacent to and in direct contact with a second segment. A pivot site is located between the first segment and the second segment, about which the first segment and the second segment are arranged to pivot. The plurality of anti-slip segments may be selected from the group consisting of metal segments, glass reinforced plastic segments, fiberglass segments and combinations thereof. Other segment materials may be suitable provided that the selected segment material is capable of penetrating a spigot end of a pipe.

According to yet another aspect of the invention there is provided a pipe joint restraining apparatus including a gasket and a plurality of segments at least partially embedded in the gasket and circumferentially arranged therein, the plurality of segments including teeth arranged to engage a spigot end of a pipe that is inserted through the gasket. The plurality of segments includes at least two segments that are in direct contact and pivotally coupled together. The at least two segments further include a first segment having a first lateral face that is located adjacent to a second lateral face of the second segment. The at least two segments can be selectively arranged to define between them a space having a substantially V-shaped cross-section. A flexible connector portion may extend to and between the at least two segments, either as a remnant of the manufacturing process of the segments, or intentionally, for example, for managing the amount of flexibility between the segments. The flexible connector portion can be used in instances wherein the segments are arranged in groups including three or more segments.

DETAILED DESCRIPTION OF PRESENTLY PREFERRED EMBODIMENTS

Figure 2:
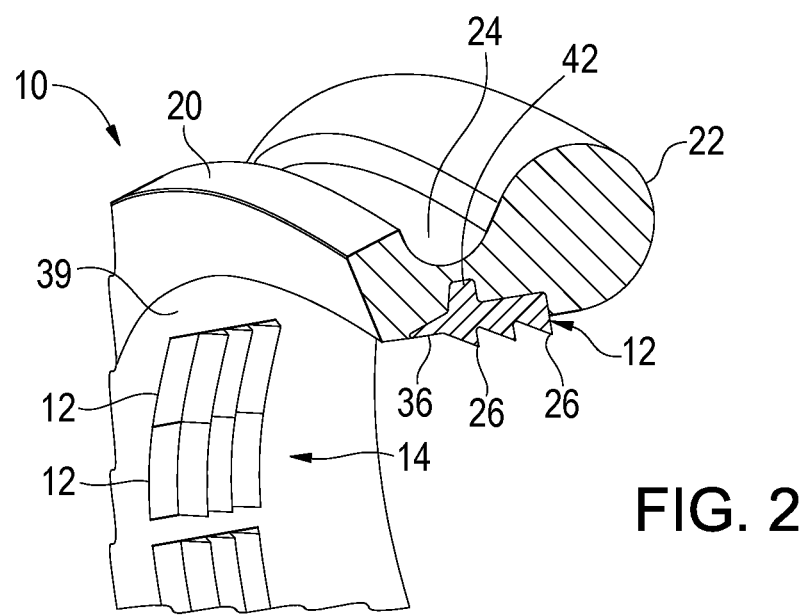
FIG. 2 is a sectional view of the gasket of FIG. 1.
Figure 3:
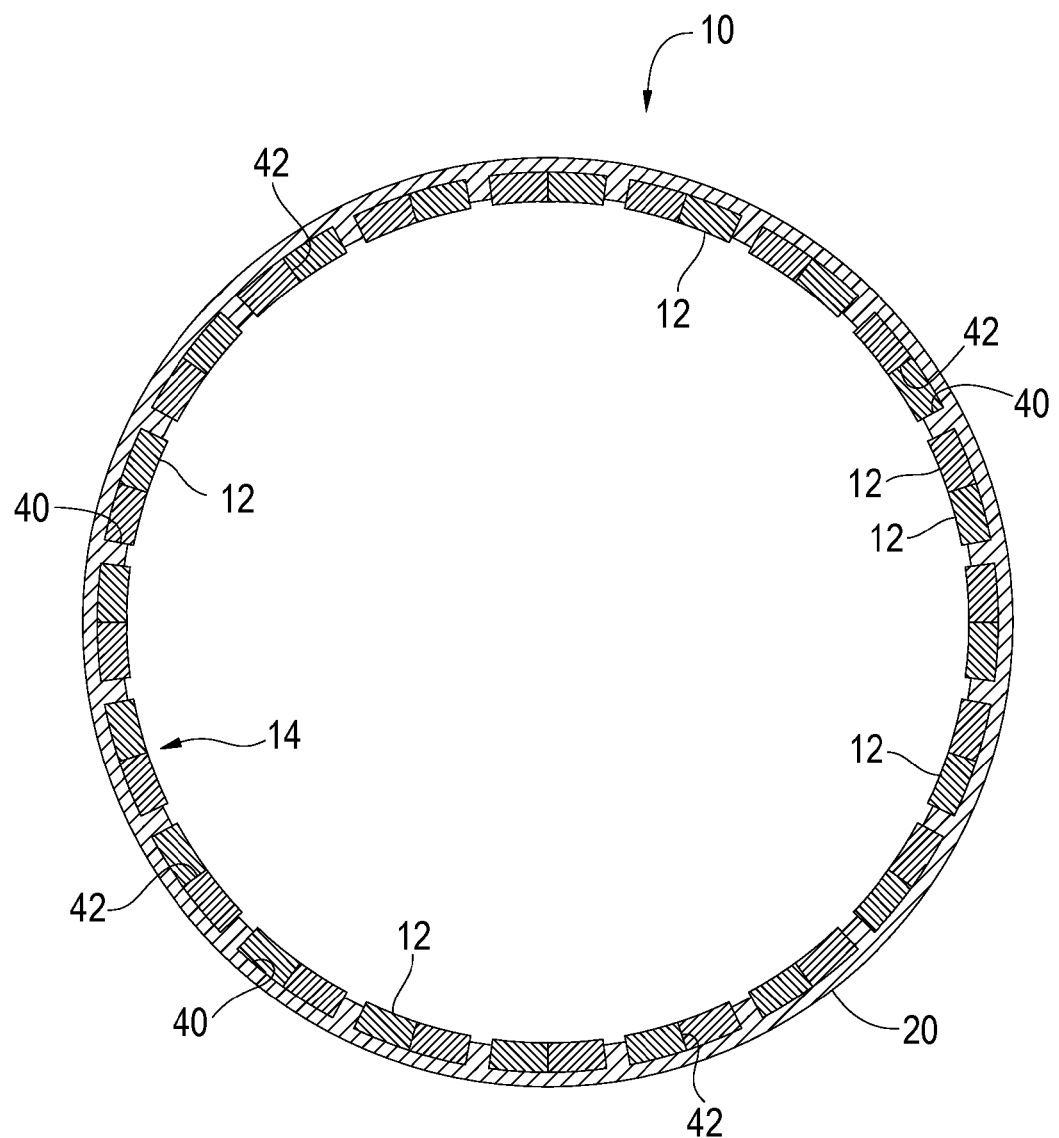
FIG. 3 is another sectional view of the gasket of FIG. 1
Figure 4:
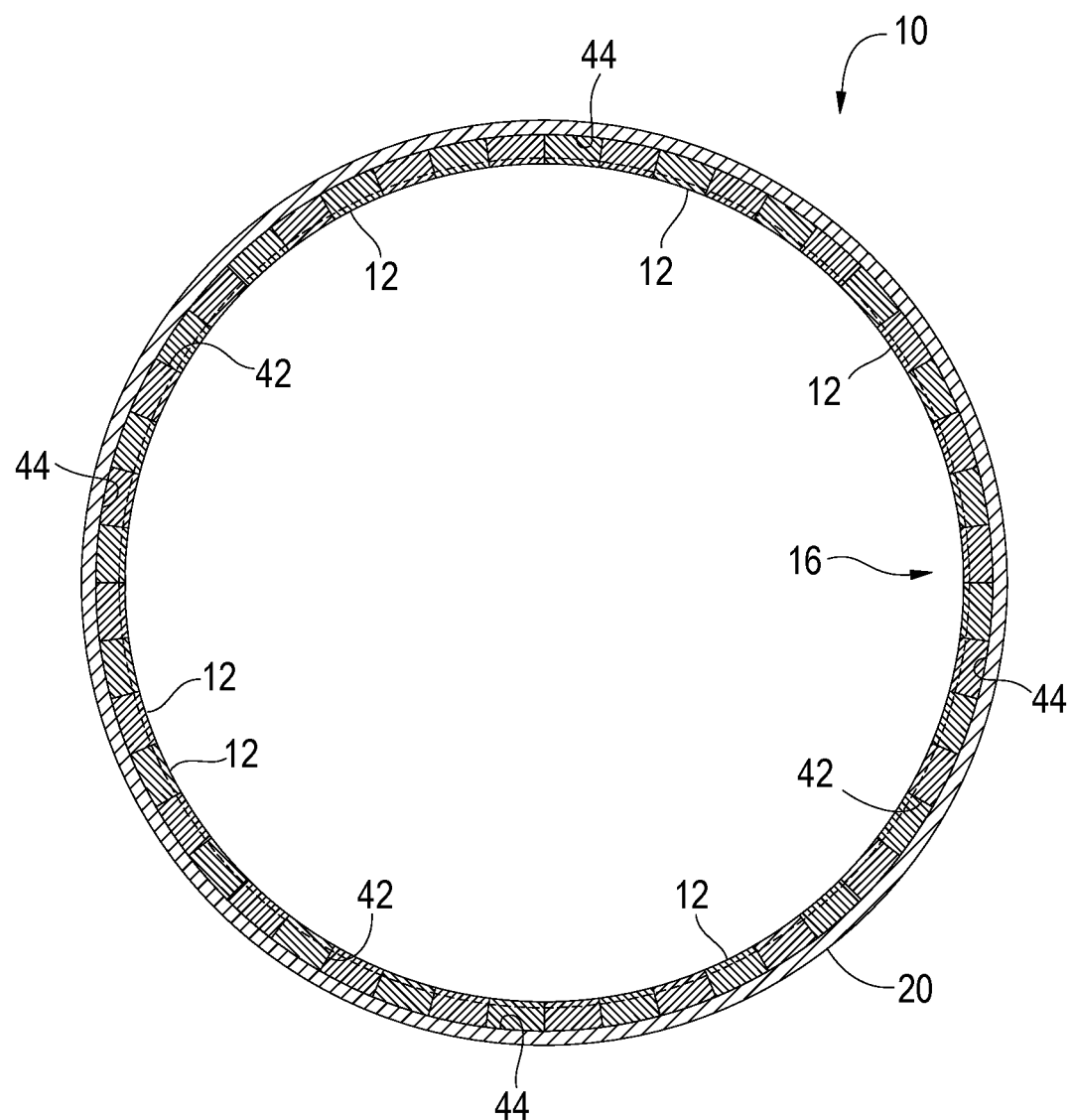
FIG. 4 is a sectional view of another gasket in accordance with the present invention.
Figure 5:
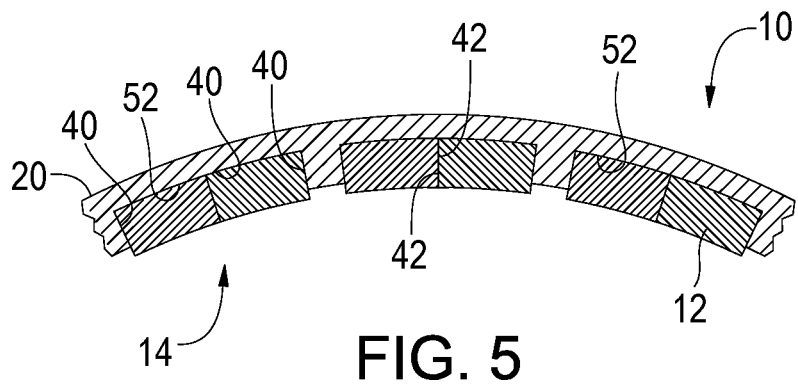
FIGS. 5 and 6 are sectional views of the gasket of FIG. 1 showing the arrangement of a pair of the segments between a resting gasket configuration in FIG. 5 and a flexed gasket configuration in FIG. 6.
Figure 6:
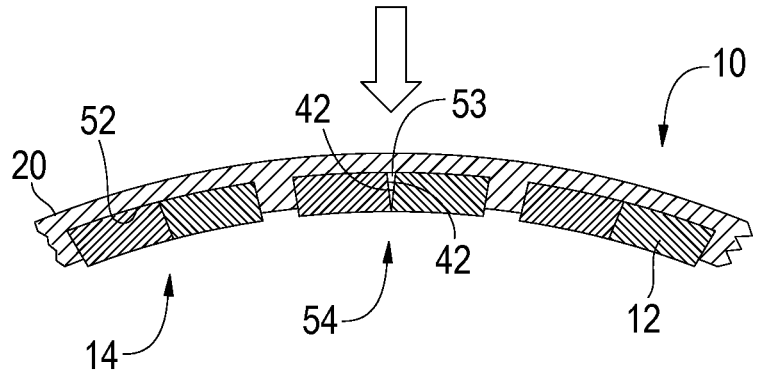
Figure 7:
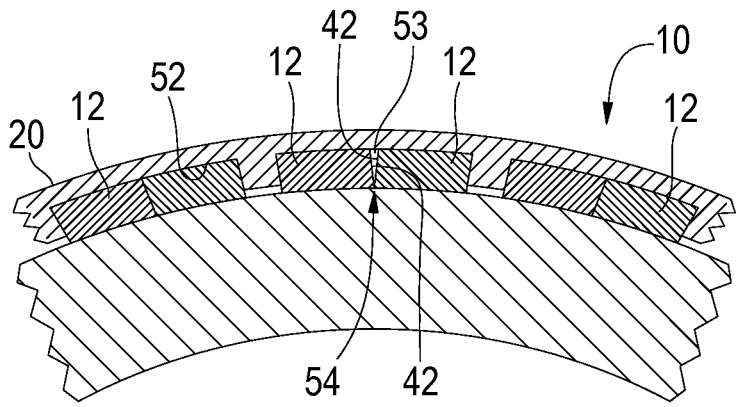
FIG. 7 is a sectional view of the gasket of FIG. 6 engaged with a spigot end of a pipe.

FIGS. 1 through 7 depict pipe joint gaskets in accordance with the present invention. In particular, FIGS. 1 through 3 and 5 through 7 depict a first pipe joint gasket 10 that includes anti-slip segments 12 arranged in a plurality of pairs 14 and circumferentially arranged throughout gasket 10. Each pair 14 of segments 12 is located between and spaced apart from adjacent pairs 14 of segments 12. FIG. 4 depicts a second pipe joint gasket 100 that includes anti-slip segments 12 circumferentially arranged throughout gasket 100 to form a continuous ring 16 of segments 12.

Gaskets 10 and 100 are for inhibiting leakage within a pipe joint between the inside wall of a bell end of a first pipe and the outside wall of a spigot end of a second pipe. Generally, the inner surface of the bell end includes a retainer groove bounded by a radially extending front wall, an axially extending retainer wall and an axially extending sealing wall. Extending radially inward from the retainer wall is a retainer shoulder. Gaskets 10 and 12 are configured to be positioned within the retainer groove with an outer face thereof being arranged adjacent to the axially extending retainer wall, a heel portion 20 arranged between the front wall and the retainer wall and a sealing bulb portion 22 arranged against the sealing wall. The outer face of each of gaskets 10 and 100 includes an annular groove 24 formed between heel portion 20 and sealing portion 22. Annular groove 24 is arranged to receive the retainer shoulder and interact there with. Segments 12 are firmly vulcanized into radial grooves found within heel portion 20 in gaskets 10 and 100. The number of segments 12 inserted into gaskets 10 and 100 varies depending upon the anticipated fluid pressure at the pipe joint 16 and the size of the pipes involved. An exemplary pipe joint displaying the interaction of a pipe gasket with joined pipes is described in U.S. Pat. No. 8,490,273, the entire contents of which are incorporated herein by reference.

Segments 12 are configured and arranged within gaskets 10 and 100 for decreasing the radial load exerted between the joined pipes upon pressurization thereof. Referring to FIG. 2 each segment 12 includes a substantially flat, outer surface 34 embedded within the compressible body of the gaskets and a substantially flat inner surface 36. Outer surface 34 and inner surface 36 are arranged parallel to an inner radial face 39 of heel portion 20. In some instances, inner surface 36 of segment 12 may be exposed thereby forming a portion of inner radial face 39 of heel portion 20. In other instances, inner surface 36 may be embedded within the gasket material of gaskets 10 and 100. One or more teeth 26 are arranged to extend radially inwardly from inner surface 34. Teeth 26 are arranged to be planar meaning the acutely pointed tips of the teeth are coplanar. Thus, the teeth are not arranged in an arc. In other instances, the teeth may be arranged in an arc. Outer surface 36 of segment 12 may include one or more substantially rectangular protrusions 42 extending radially outward therefrom and into the gasket. Protrusions 42 act to anchor segment 12 within the gaskets 10 and 100 and to transfer axial loads from segment 12 to the gaskets.

While a particular segment design is described herein for use with gaskets 10 and 100, it is understood that the invention is not limited to any single anti-slip segment design. For example, anti-slip segments like those described in U.S. Pat. Nos. 5,295,697, 5,464,228 and 8,490,273 are suitable for use in the present invention, as are other anti-slip segment designs known, or yet to be known, in the art for use in self-restraining pipe gaskets. However, to increase the area of engagement between segments 12 and the spigot end of a pipe, segments 12 will usually have a width that is smaller than the widths of conventional anti-slip segments found in similarly sized gaskets. Thus, the present invention relates to the unique articulating arrangement of anti-slip segments within a pipe gasket.

Figure 1:
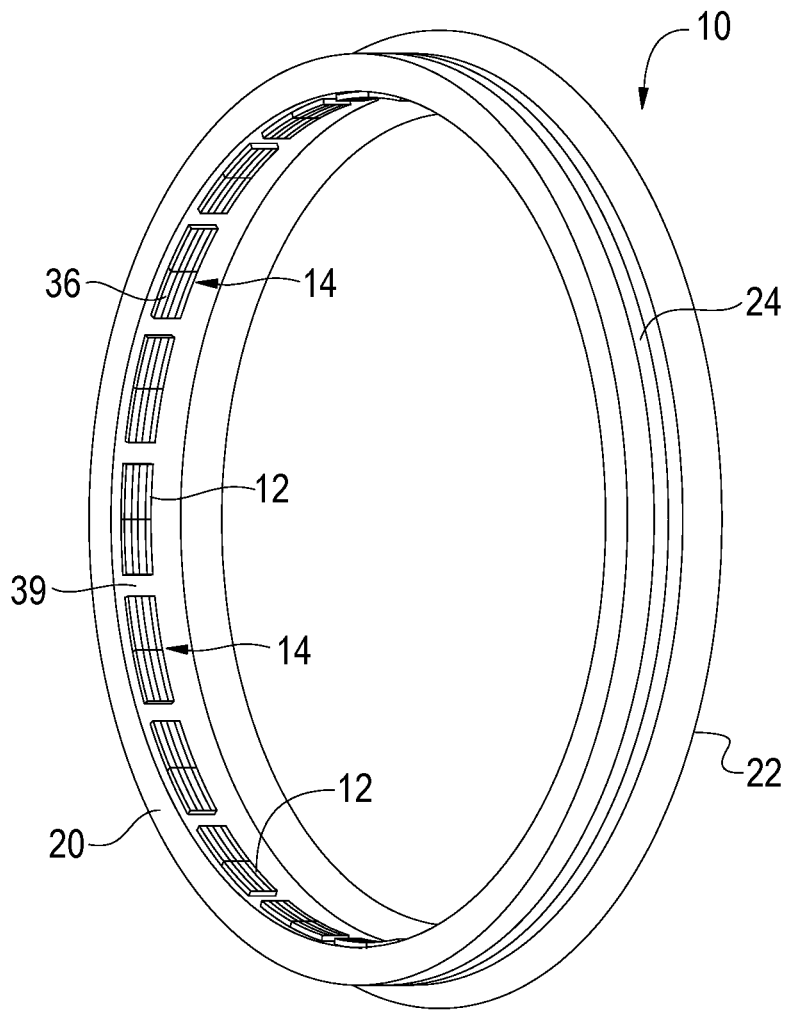
FIG. 1 is a perspective view of a gasket in accordance with the present invention.

Referring to FIGS. 1 through 3, there is depicted first pipe joint gasket 10 including anti-slip, segments 12 arranged in a plurality of pairs 14 and circumferentially arranged throughout gasket 10. Each pair 14 of segments 12 is embedded within a groove 40 within heel portion 20. Each groove 40 is configured to retain a single pair 14 of segments 12 within gasket 10 and maintain the segments 12 in direct contact, while presses adjacent radially extending, lateral faces 42 thereof together. Arranged in this manner, no portion of the compressible body gasket 10 is situated between the pair of segments 12 or adjacent to lateral faces 42. It is understood that segments 12 may be arranged within a groove of a gasket in groups numbering 3 or more.

Referring to FIG. 100, there is depicted second pipe joint 100 including anti-slip segments 12 circumferentially arranged throughout gasket 100 to form a continuous ring 16 of segments 12. In gasket 100, segments 12 are arranged and embedded within a single, continuous groove 44 extending around foot portion 20 of the gasket. Each segment 12 is located between two other segments 12 so the opposing, lateral faces 42 of each segment 12 are pressed against a lateral face 42 of each of the two adjacent segments 12. This places each segment 12 between two adjacent segments 12 thereby creating continuous ring 16 of segments 12 within groove 44. Like gasket 10, no portion of the compressible body of gasket 100 is situated between segments 12 or adjacent to lateral radial faces 42.

Segments 12 in gaskets 10 and 100 are free to articulate relative to one another as gaskets 10 and 100 are flexed or stretched, for example, during insertion of a spigot into the gaskets. In particular, referring to FIGS. 5 through 7, when gasket 10 is in a resting state, a lateral face 42 of each segment 12 of each pair 14 is arranged parallel to, and in contact with, the lateral face 42 of the adjacent segment 12 of the pair 14. Essentially no space is provided between the radially extending faces 42. When gasket 10 is stretched to receive spigot 50, segments 12 in one or more of the segment pairs 14 are caused to pivot at a point 50 located about the intersection of adjacent lateral faces 42 with an axial face 52 of groove 40. A V-shaped space 54 is thereby formed between radially extending lateral faces 42. Space 54 is free of any compressible material originating from gasket 10. By pivoting segments 12 of pairs 14 at pivot points 53, each pair 14 of segments 12 is allowed to articulate according to the curvature of the outer surface of spigot 50 and improve the engagement area between the spigot and the segments. Additionally, by utilizing segments having widths, as measured between faces 42 of each segment, that may be smaller than the widths of conventional anti-slip segments in similarly-sized gaskets, the area of engagement between segments 12 and spigot end 50 is further improved.

In use, as a pipe joint is pressurized, teeth 26 of segments 12 engage with spigot end 50 by friction or by penetrating into spigot end 50 a short distance. This occurs as the axial load created by the tendency of the pipes to want to separate when under pressure is transmitted radially and axially by teeth 26 and gasket 10 to and between the front wall of the retainer groove and spigot end 50 thereby resisting pipe separation. Because of the greater engagement surface area between segments 12 and spigot 50, the radial forces imparted to spigot 50 by segments 12 during pipe joint pressurization are more evenly distributed about the spigot than in conventional pipe joints. Accordingly, the likelihood of failure of the pipe joint caused by over-penetration of teeth 26 of segments 12 is reduced.

As will be apparent to one skilled in the art, various modifications can be made within the scope of the aforesaid description. Such modifications being within the ability of one skilled in the art form a part of the present invention and are embraced by the claims below.

It is claimed:

1. A pipe gasket comprising,
   a compressible body having an inner face defining an opening for receiving a spigot end of a pipe,
   a plurality of anti-slip segments at least partially embedded in the compressible body and circumferentially arranged therein,
   wherein the plurality of anti-slip segments includes a first segment in direct contact with a second segment, each of the first segment and the second segment having at least one tooth extending radially inward through the inner face;
   wherein the first segment includes a continuous first radially planar face extending from inner to outer diameters of the first segment;
   wherein the second segment includes a continuous second radially planar face extending from inner to outer diameters of the second segment;
   wherein the continuous first radially planar face in direct contact with the continuous second radially planar face at said inner diameters of the first and second segments;
   wherein an empty void located between the first radially planar face and the continuous second radially planar face at said outer diameters of the first and second segment.

2. The pipe gasket according to claim 1 wherein the first segment is not integral with the second segment.

3. The pipe gasket according to claim 1 wherein essentially no portion of the compressible body is situated directly between the first radially planar face and the second radially planar face.

4. The pipe gasket according to claim 1 wherein essentially no portion of the compressible body is situated directly between the first segment and the second segment.

5. The pipe gasket according to claim 1 wherein the first segment and the second segment are contained with a single pocket of the compressible body, the single pocket excluding all other anti-slip segments of the plurality of anti-slip segments.

6. The pipe gasket according to claim 1 wherein each anti-slip segment of the plurality of anti-slip segments is in direct contact with one other anti-slip segment of the plurality of anti-slip segments.

7. The pipe gasket according to claim 1 wherein the plurality of anti-slip segments is selected from group consisting of metal segments, glass reinforced plastic segments, fiberglass segments and combinations thereof.

8. The pipe gasket according to claim 1 wherein said empty void having a substantially V-shape cross-section.

\* \* \* \* \*